(12) United States Patent
Won

(10) Patent No.: US 12,448,034 B2
(45) Date of Patent: Oct. 21, 2025

(54) STEERING CONTROL DEVICE AND METHOD

(71) Applicant: HL MANDO CORPORATION, Pyeongtaek (KR)

(72) Inventor: Jong Chun Won, Suwon (KR)

(73) Assignee: HL MANDO CORPORATION, Pyeongtaek (KR)

( * ) Notice: Subject to any disclaimer, the term of this patent is extended or adjusted under 35 U.S.C. 154(b) by 204 days.

(21) Appl. No.: 17/736,047

(22) Filed: May 3, 2022

(65) Prior Publication Data

US 2022/0379954 A1    Dec. 1, 2022

(30) Foreign Application Priority Data

May 28, 2021    (KR) .......... 10-2021-0069350

(51) Int. Cl.
    *B62D 5/00*        (2006.01)
    *B62D 3/12*        (2006.01)
    *B62D 5/04*        (2006.01)

(52) U.S. Cl.
CPC ............ *B62D 5/0496* (2013.01); *B62D 3/12* (2013.01); *B62D 5/0463* (2013.01); *B62D 5/0481* (2013.01); *B62D 5/0424* (2013.01)

(58) Field of Classification Search
CPC ...... B62D 5/0496; B62D 3/12; B62D 5/0463; B62D 5/0481
USPC ........................................ 701/29.2
See application file for complete search history.

(56) References Cited

U.S. PATENT DOCUMENTS

| | | | |
|---|---|---|---|
| 6,175,793 B1 | 1/2001 | Ironside | |
| 2010/0305803 A1 | 12/2010 | Schusteritz | |
| 2011/0190984 A1* | 8/2011 | Reeve | B62D 5/0481 701/41 |
| 2016/0280251 A1* | 9/2016 | George | B62D 6/006 |
| 2017/0203786 A1* | 7/2017 | Min | B62D 15/021 |
| 2018/0119595 A1* | 5/2018 | Villegas Muriel | F01P 1/06 |
| 2018/0237056 A1 | 8/2018 | Bremkens | |
| 2020/0070872 A1* | 3/2020 | Ushiro | B62D 5/04 |
| 2020/0148253 A1* | 5/2020 | Sainath | B62D 5/0463 |
| 2022/0048563 A1* | 2/2022 | Schäfer | B62D 6/008 |

FOREIGN PATENT DOCUMENTS

| | | |
|---|---|---|
| CN | 102730055 A | 10/2012 |
| CN | 104029715 A | 9/2014 |
| CN | 105270470 A | 1/2016 |

(Continued)

OTHER PUBLICATIONS

KR NOA dated Mar. 31, 2022.
(Continued)

*Primary Examiner* — Helal A Algahaim
*Assistant Examiner* — Michael T Dowling
(74) *Attorney, Agent, or Firm* — Harvest IP Law, LLP

(57) ABSTRACT

A steering control device comprises a receiver receiving a motor torque from a motor torque sensor provided in a host vehicle and a controller enabling a steering gear to be driven in a compliance zone, calculating a friction of the steering gear based on the motor torque received by the driving of the steering gear, determining a state of the steering gear based on the calculated friction, and outputting, to a driver, a notification message for the state of the steering gear.

9 Claims, 7 Drawing Sheets

(56) References Cited

FOREIGN PATENT DOCUMENTS

| CN | 110987272 A | 4/2020 | | |
|---|---|---|---|---|
| DE | 102006017775 A1 | 10/2007 | | |
| DE | 102008021848 A1 | * 11/2009 | ........... | B62D 5/0463 |
| DE | 102013220519 A1 | * 4/2014 | ........... | B62D 5/0481 |
| DE | 102014201952 A1 | 9/2014 | | |
| DE | 1020 18217474 A1 | 4/2020 | | |
| JP | 2004352090 A | 12/2004 | | |
| KR | 20140013805 A | 2/2014 | | |
| KR | 20150082912 A | 7/2015 | | |
| KR | 20190135845 A | 12/2019 | | |
| KR | 20200109805 A | 9/2020 | | |
| WO | 2364896 A1 | 9/2011 | | |
| WO | 2020-053069 A1 | 3/2020 | | |

OTHER PUBLICATIONS

Office Action issued in Chinese Patent Application No. 202210597889.0 dated Nov. 15, 2024.
Office Action issued in Germany Patent Application No. 102022205254.4 dated Mar. 12, 2025.
Notice of Allowance issued in Chinese Patent Application No. 202210597889.0 dated Aug. 18 , 2025.

\* cited by examiner

STEERING CONTROL DEVICE AND METHOD

CROSS-REFERENCE TO RELATED APPLICATION

This application claims priority from Korean Patent Application No. 10-2021-0069350, filed on May 28, 2021, which is hereby incorporated by reference for all purposes as if fully set forth herein.

BACKGROUND

Field

The present embodiments relate to a steering control device and method.

Description of Related Art

The electric steering device detects the steering torque generated by the rotation of the steering wheel and controls the motor to supply steering assist power proportional to the detected steering torque, thereby performing steering control on the vehicle.

Specifically, in electronic power steering, the steering torque generated by the rotation of the steering wheel is transferred to the rack bar via the rack-pinion mechanism, and the steering assist power generated by the motor according to the steering torque is also transferred to the rack bar. In other words, the steering assist power generated from the motor is added to the steering torque generated by the steering wheel, axially moving the rack bar and hence steering the vehicle.

Such electronic power steering may experience a reduction in friction between several members, e.g., the rack-pinion mechanism or reducer, of the mechanism constituting the device, due to, e.g., wear to the members or weakened fastening force which may occur as the vehicle mileage increases. As another example, the rack-pinion mechanism or reducer may build up with rust, increasing the friction between several members of the mechanism.

An increase or decrease in friction between internal members of the electronic power steering may cause the driver to feel uncomfortable in steering.

In an aspect, the disclosure provides a steering control device comprising a receiver receiving a motor torque from a motor torque sensor provided in a host vehicle and a controller enabling a steering gear to be driven in a compliance zone, calculating a friction of the steering gear based on the motor torque received by the driving of the steering gear, determining a state of the steering gear based on the calculated friction, and outputting, to a driver, a notification message for the state of the steering gear.

In another aspect, the disclosure provides a steering control method comprising an information reception step receiving a motor torque from a motor torque sensor provided in a host vehicle, a friction calculation step enabling a steering gear to be driven in a compliance zone and calculating a friction of the steering gear based on the motor torque received by the driving of the steering gear, and a state determination step determining a state of the steering gear based on the calculated friction.

According to the disclosure, the steering control device and method may calculate and quantify only friction of the steering gear, determining the state of the steering gear according to the calculated friction.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
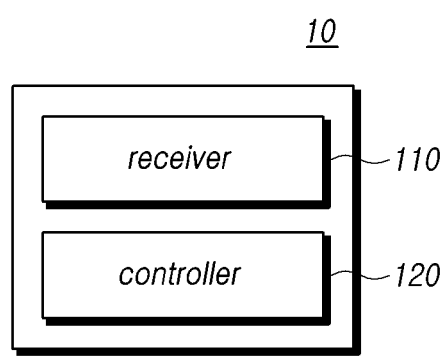
FIG. 1 is a block diagram illustrating a steering control device according to an embodiment of the disclosure.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, a steering control device according to an embodiment of the disclosure is described with reference to the accompanying drawings.

FIG. 1 is a block diagram illustrating a steering control device 10 according to an embodiment of the disclosure.

Referring to FIG. 1, a steering control device 10 according to an embodiment of the disclosure may include a receiver 110 and a controller 120.

According to an embodiment of the disclosure, the steering control device 10 may be an advanced driver assistance system (ADAS) that is equipped in a host vehicle to provide information helpful for driving the host vehicle or assist the driver in the host vehicle.

Here, ADAS may refer to various types of advanced driver assistance systems. For example, the driver assistance system may include, e.g., autonomous emergency braking, smart parking assistance system (SPAS), blind spot detection (BSD), adaptive cruise control (ACC), lane departure warning system (LDWS), lane keeping assist system (LKAS), and lane change assist system (LCAS). However, the disclosure is not limited thereto.

Here, host vehicle may mean a vehicle equipped with a prime mover and driven by the power of the prime mover. Further, the host vehicle may be an electric vehicle that is an electricity-powered vehicle that obtains driving energy by rotating a motor with electricity from a battery rather than obtaining driving energy from combustion of a fossil fuel.

The steering control device 10 is applicable both where the host vehicle is a manned vehicle or where the host vehicle is a driverless, autonomous vehicle.

The receiver 110 may receive a motor torque from a motor torque sensor provided in the host vehicle.

The above-described motor torque sensor may be mounted to the host vehicle. In an embodiment, the motor torque sensor may be included in the steering control system 1.

Hereinafter, an embodiment of the steering control system 1 in which the functions of the steering control device 10 may be performed is described.

Figure 2:
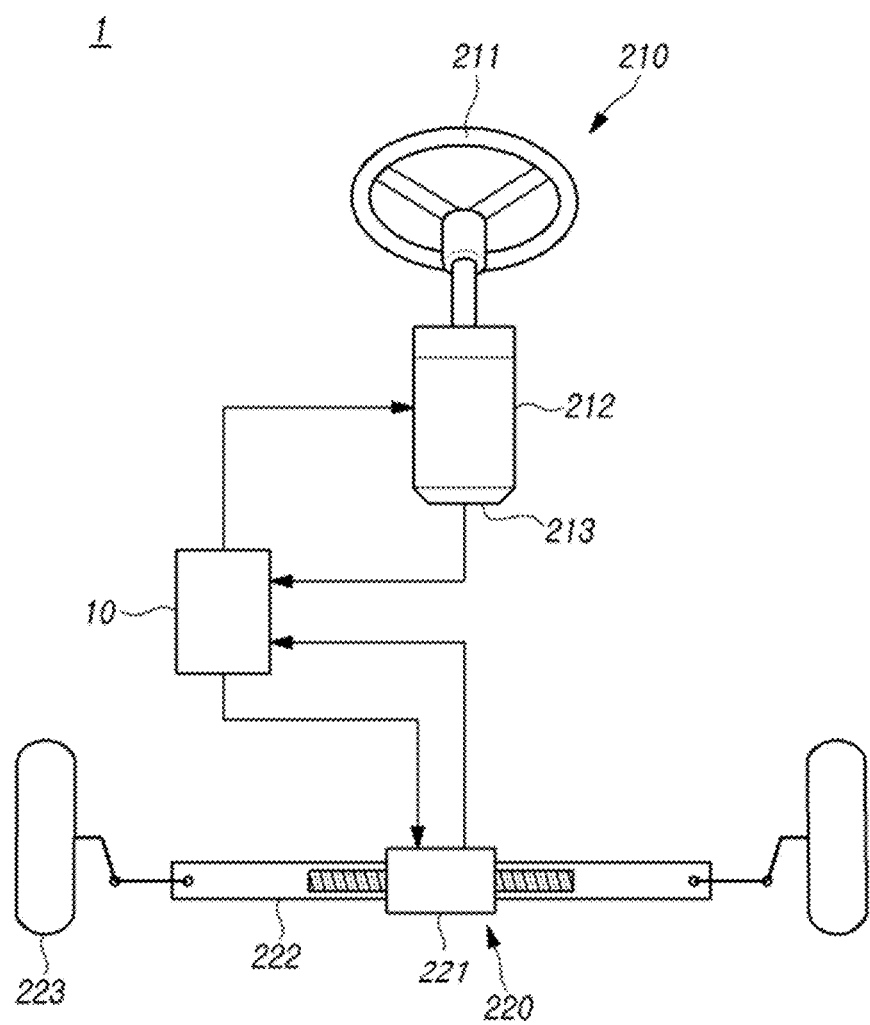
FIG. 2 is a view schematically illustrating a steering control system according to an embodiment.

FIG. 2 is a view schematically illustrating a steering control system 1 according to an embodiment.

Referring to FIG. 2, the steering control system 1 according to an embodiment may mean a system in which the steering of the host vehicle equipped with the steering control system 1 is controlled according to the rotation angle of the steering wheel 211 manipulated by the driver.

The steering control system 1 may include hydraulic power steering (HPS), which generates hydraulic pressure by rotating a pump to provide steering assist force, and electronic power steering (EPS), which drives a motor to provide steering assist force, depending on driving types. The following description focuses primarily on the electronic steering control system 1, but the disclosure is not limited thereto.

The steering control system 1 may be a mechanical steering control system 1, which steers the wheel 223 by transferring the force (torque) generated by the driver turning the steering wheel 211 to the steering motor 221 via a mechanical power transmission device (e.g., linkage) to steer the wheel 223 by the driving of the steering motor 221, or a steer-by-wire (SbW) system, which transfers power by transmitting/receiving electric signals through, e.g., a cable, instead of a mechanical power transmission device, depending on whether the steering input actuator 210 and the steering output actuator 220 is coupled through a mechanical connecting member (or linkage). An example in which the steering control system 1 is an SbW system is described below, but the disclosure is not limited thereto.

The steering control system 1 according to the disclosure, as shown in FIG. 2, may include a steering input actuator 210, a steering control device 10, and a steering output actuator 220. As described above, if the steering control system 1 is an SbW system, the steering input actuator 210 and the steering output actuator 220 may be mechanically separated from each other.

The steering input actuator 210 may refer to a device to which steering information intended by the driver is input. As described above, the steering input actuator 210 may include a steering wheel 211, a steering shaft 212, and a reaction force motor 213. Although not shown, the steering angle information may further include a steering gear for transferring the rotational force of the reaction force motor 213 to the steering shaft 212.

The reaction force motor 213 may receive a control signal (or referred to as a 'command current') from the steering controller 10 and apply a reaction force to the steering wheel 211. Specifically, the reaction force motor 213 may receive a command current from the steering control device 10 and drive at a rotation speed indicated by the command current, generating reaction torque. The generated reaction torque may be transferred to the steering wheel through the steering gear.

The steering control device 10 may receive steering information from the steering input actuator 210, calculate a control value, and output an electrical signal indicating the control value to the steering output actuator 220. The steering information may mean information including at least one of a steering angle or a torque.

The steering control device 10 may receive, as feedback, power information actually output from the steering output actuator 220, calculate a control value, and output an electrical signal based on the control value to the steering output actuator 220, providing the driver with a steering sensation (steering feeling).

The steering output actuator 220 may mean a device that actually drives the steering of the host vehicle. The steering output actuator 220 may include, e.g., a steering motor 221, a rack 222, and a wheel 223.

The steering input actuator 210 and the steering output actuator 220 may further include a motor torque sensor capable of detecting the motor torque of each of the reaction force motor 213 and the steering motor 221.

The steering motor 221 may axially move the rack 222. Specifically, the steering motor 221 may be driven by receiving a command current from the steering control device 10 and linearly move the rack 222 in the axial direction. The wheel 223 may be steered to the left or right through the linear movement of the rack 222.

Although not shown, the steering control system 1 according to the disclosure may further include, e.g., a clutch for separating or connecting the steering input actuator 210 and the steering output actuator 220. The clutch may be operated by the control of the steering control device 10.

If the steering control system 1 according to the disclosure is an SbW system, and the host vehicle travels in an autonomous driving mode, the steering control system 1 according to the disclosure may control only the steering output actuator 220 to perform steering control on the host vehicle or may control both the steering input actuator 210 and the steering output actuator 220 to perform steering control on the host vehicle.

Referring back to FIG. 1, the controller 120 may enable the steering gear to be driven in the compliance zone, calculate the friction of the steering gear based on the motor torque received by the driving of the steering gear, determine the state of the steering gear based on the calculated friction, and output a notification message for the state of the steering gear to the driver.

The controller 120 may estimate the rack force based on sensing information about the motor torque of the receiver 110. The estimated rack force may mean the sum of the friction of the steering gear, the suspension friction of the host vehicle, and the friction of the tire. Accordingly, determination of the state of the steering gear requires an environment in which only the friction of the steering gear may be calculated.

Figure 3:
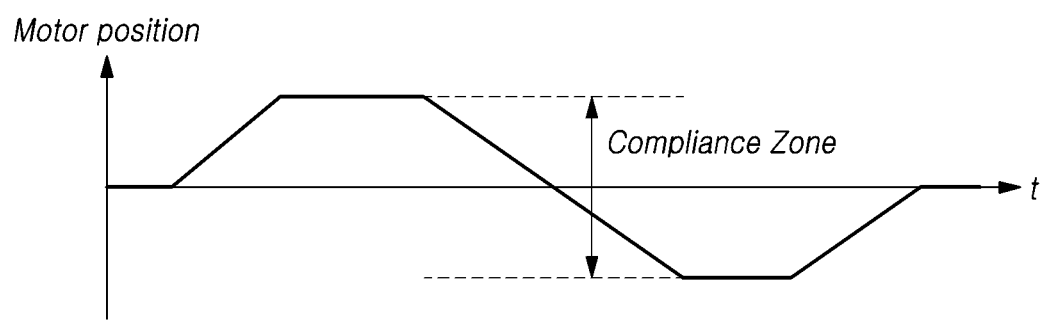
FIGS. 3 and 4 are views illustrating an example of calculating friction using a compliance zone according to an embodiment.
Figure 4:
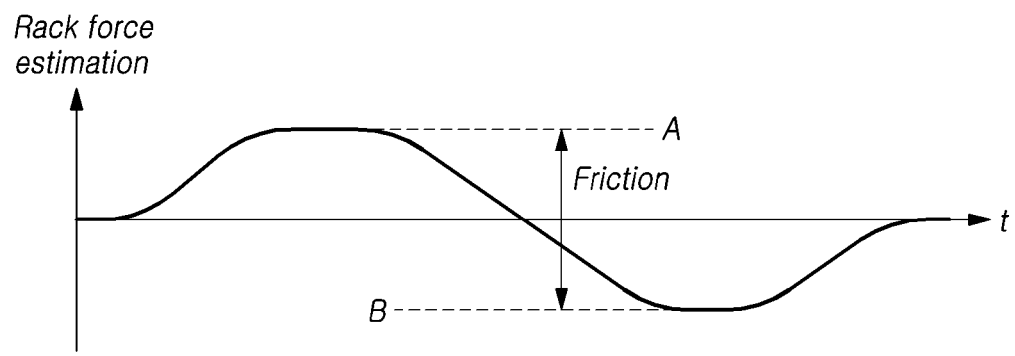

FIGS. 3 and 4 are views illustrating an example of calculating friction using a compliance zone according to an embodiment.

Referring to FIGS. 3 and 4, it is possible to calculate the friction of the steering gear by enabling the steering gear to be driven in the compliance zone. The compliance zone may be set to a range of motor positions in which the rack is not moved even when the steering gear is driven. Specifically, the steering gear may be driven by the steering motor, which is controlled by the command signal from the steering control device 10, and the rack may thus be moved. However, there may be a tiny segment where the rack is not moved although the steering gear is driven by the steering motor, and such a tiny segment may be defined as the compliance zone.

Referring to FIG. 3, the compliance zone may be set to a range of motor positions. Motor position may mean the angle at which the motor rotates clockwise or counterclockwise. Thus, the compliance zone may be set based on a preset rotation angle of the motor.

The range of motor positions in which the rack is not moved although the steering gear is driven by the steering motor may vary depending on the mechanical specifications of the steering gear. Accordingly, the compliance zone may be set to differ depending on the mechanical specifications of the steering gear.

Referring to FIG. 4, the controller 120 may receive, from the motor torque sensor, the motor torque generated by the steering motor by the driving of the steering gear to thereby calculate a rotational force estimation. The calculated rotational force estimation may be produced in the graph shown in FIG. 4.

In FIGS. 4, A and B may be the maximum value and the minimum value, respectively, of the rotational force estimation, but are not limited thereto. For example, in a segment where the motor position is constant, the rotational force estimation may be varied, in which case A and B each may be the average of the varied rotational force estimations.

The controller 120 may calculate the friction of the steering gear based on A and B. For example, the friction of the steering gear may be the average obtained by dividing A and B by 2.

Accordingly, it is possible to calculate the rotational force estimation based on the torque generated by the steering motor when the steering gear is driven in the compliance zone so that the rack is not moved and to calculate the friction of the steering gear based on the rotational force estimation. If the steering gear is driven in the compliance zone, the actual position of the rack is not varied so that only internal components of the steering gear are operated without influence on the suspension friction and tire friction. Thus, it is possible to make an environment that the friction of the steering gear alone may be calculated.

The compliance zone is not limited to the position of the rack. In other words, wherever the rack is positioned, if the position of the rack is at the midpoint between forces, it is possible to calculate the friction of the steering gear as the steering gear is driven in the compliance zone based on the rack positioned at the midpoint between forces. In other words, although the rack is not positioned at the center, the steering gear is driven in the compliance zone where the position of the rack is not changed from the midpoint between forces, so that the friction of the steering gear may be calculated.

The controller 120 may control the steering gear to be driven in the compliance zone before the host vehicle is steered by the driver, calculating the friction of the steering gear and determining the state of the steering gear based on the calculated friction of the steering gear. For example, the controller 120 may control the steering gear to be driven in the compliance zone before the host vehicle starts and performs steering, thereby determining the state of the steering gear. As another example, the controller 120 may control the steering gear to be driven in the compliance zone before the host vehicle, which used to travel and has stopped so that its speed is zero, performs steering again, thereby determining the state of the steering gear.

As described above, the controller 120 may determine the state of the steering gear based on the calculated friction of the steering gear. Described below are various embodiments for the state of the steering gear determined according to the calculated friction of the steering gear.

For example, if the calculated friction is a preset first reference value or more, the controller 120 may determine that the steering gear has been damaged. The preset first reference value may mean the maximum value at which the steering gear may be driven without damage. In this case, the controller 120 may output a notification message for the damage to the steering gear to the driver.

As another example, the receiver 110 may further receive the temperature from a temperature sensor provided in the host vehicle. The received temperature may be the internal temperature of the host vehicle, but is not limited thereto. For example, the temperature may be the temperature of the external environment where the host vehicle travels.

If the calculated friction is the preset first reference value or more, and the received temperature is a preset temperature or less, the controller 120 may determine that the state of the steering gear is an increase in friction due to a low temperature. In other words, the grease applied to, e.g., the bearing of the steering gear may experience a change in physical properties due to a low temperature, with the result of increased friction of the steering gear. In this case, the controller 120 may output a notification message indicating that the friction of the steering gear has increased due to a low temperature, to the driver. The controller 120 may perform additional control to increase the output of the steering motor to compensate for the friction of the steering gear increased due to the low temperature. Also, in this case, the control unit 120 may reserve the determination of damage to the steering gear until the temperature exceeds a preset temperature.

As described above, if the calculated friction is the preset first reference value or more, and the temperature, as a factor for determining the state of the steering gear, is preset, the controller 120 may distinguish and determine an increase in the friction of the steering gear due to damage to the steering gear or low temperature based on the temperature received from the temperature sensor and output a notification message for the result of the determination to the driver.

As another example, if the calculated friction is a preset second reference value or less, the controller 120 may determine that the steering gear has been worn. The preset second reference value may mean the maximum value at which part replacement is required due to wear to the steering gear. In this case, the controller 120 may output a notification message indicating that part replacement is required due to wear to the steering gear, to the driver.

As another example, if the calculated friction is less than the preset first reference value and more than the preset second reference value, the controller 120 may determine that the steering gear is in a normal state. In other words, the range between the preset first reference value and the second reference value may mean a numerical range of friction in which the steering gear may be normally driven. In this case, the controller 120 may output a notification message indicating that the steering gear is normal, but in the normal state, outputting a notification message may be omitted.

Further, although the steering gear is within the numerical range for normal driving based on the calculated friction, the controller 120 may determine that the steering gear has rust buildup based on the calculated friction. For example, the controller 120 may calculate the friction of the steering gear whenever the steering gear is driven in the compliance zone and store the calculated frictions. The controller 120 may compare the stored frictions and, if the result of comparison reveals that the friction gradually rises, determine that the steering gear has rust buildup. In other words, as rust builds up and the state worsens, the friction of the steering gear may gradually increase. The controller 120 may determine that the steering gear has rust buildup by storing and comparing the calculated frictions. In this case, the controller 120 may output a notification message indicating that repair is required due to rust buildup on the steering gear, to the driver.

As described above, the steering control device 10 according to the disclosure may calculate the friction of the steering gear and determine the state of the steering gear according to the calculated value.

The steering control device 10 may be implemented as, e.g., an electronic control unit (ECU).

According to an embodiment, a computer system (not shown), such as the steering control device 10, may be implemented as an electronic control unit (ECU). The ECU may include at least one or more of one or more processors, a memory, a storage unit, a user interface input unit, or a user interface output unit which may communicate with one another via a bus. The computer system may also include a network interface for accessing a network.

The processor may be a central processing unit (CPU) or semiconductor device that executes processing instructions stored in the memory and/or the storage unit. The memory and the storage unit may include various types of volatile/non-volatile storage media. For example, the memory may include a read only memory (ROM) and a random access memory (RAM).

Described below is a steering control method using the steering control device 10 capable of performing the above-described embodiments of the disclosure.

Figure 5:
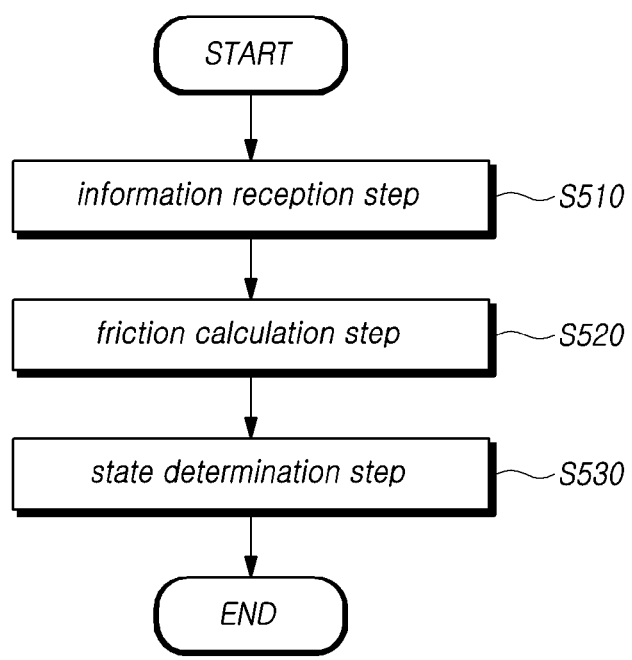
FIG. 5 is a flowchart illustrating a steering control method according to an embodiment of the disclosure.

FIG. 5 is a flowchart illustrating a steering control method according to an embodiment of the disclosure.

Referring to FIG. 5, a steering control method according to the disclosure may include an information reception step S510 for receiving a motor torque from a motor torque sensor provided in a host vehicle, a friction calculation step S520 for enabling a steering gear to be driven in a compliance zone and calculating a friction of a steering gear based on a motor torque received by driving of the steering gear, and a state determination step S530 for determining a state of the steering gear based on the calculated friction.

Although not shown, the steering control method may further include an output step (not shown) for outputting, to a driver, a notification message for the state of the steering gear determined in the state determination step S530.

Figure 6:
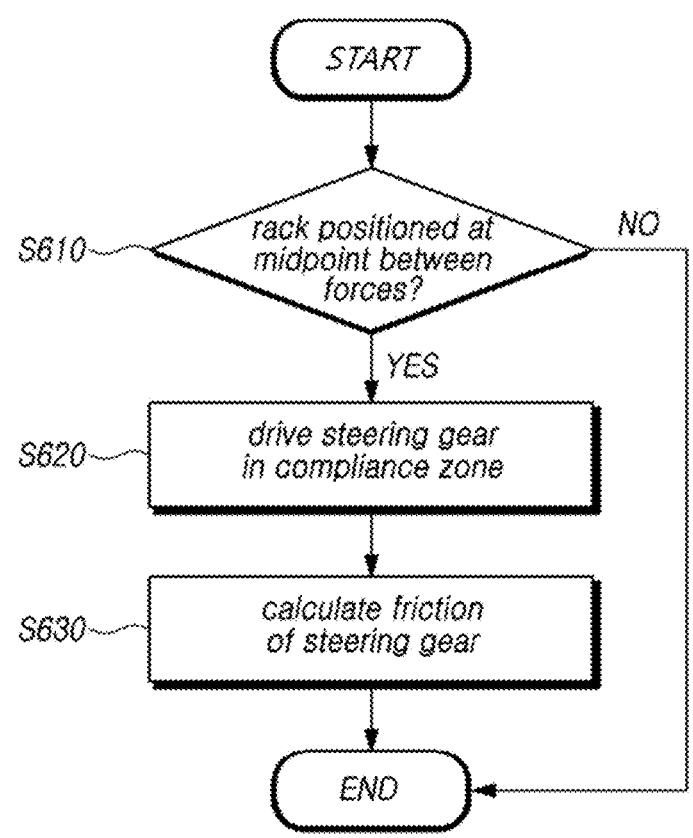
FIG. 6 is a flowchart illustrating, in greater detail, step S520 according to an embodiment.

FIG. 6 is a flowchart illustrating, in greater detail, step S520 according to an embodiment.

Referring to FIG. 6, the steering control method may determine whether the rack of the host vehicle is positioned at a midpoint between forces. The midpoint between forces may mean equilibrium of the forces. Therefore, if the rack is positioned at the midpoint between forces, the rack may be in a state in which no external force acts thereon.

The steering control method may control the steering gear to be driven in the compliance zone (S620). The compliance zone may be set to a range of motor positions in which the rack is not moved even when the steering gear is driven. In general, the rotational force estimation may mean the sum of the friction of the steering gear, the suspension friction of the host vehicle, and the tire friction. If the steering gear is driven in the compliance zone, the rack is not moved, so that it is possible to calculate the friction of the steering gear alone, based on the rotational force estimation.

The control to drive the steering gear in the compliance zone may be performed before the steering of the host vehicle is performed by the driver. For example, it is possible to control the steering gear to be driven in the compliance zone before the host vehicle starts and performs steering or before the host vehicle, which used to travel and has stopped so that its speed is zero, performs steering again.

The steering control method may calculate the friction of the steering gear (S630). For example, the steering control method may calculate the rotational force estimation by receiving, from the motor torque sensor, the motor torque generated by the steering motor by the driving of the steering gear when the steering gear is driven in the compliance zone and calculate the friction of the steering gear based on the calculated rotational force estimation.

Figure 7:
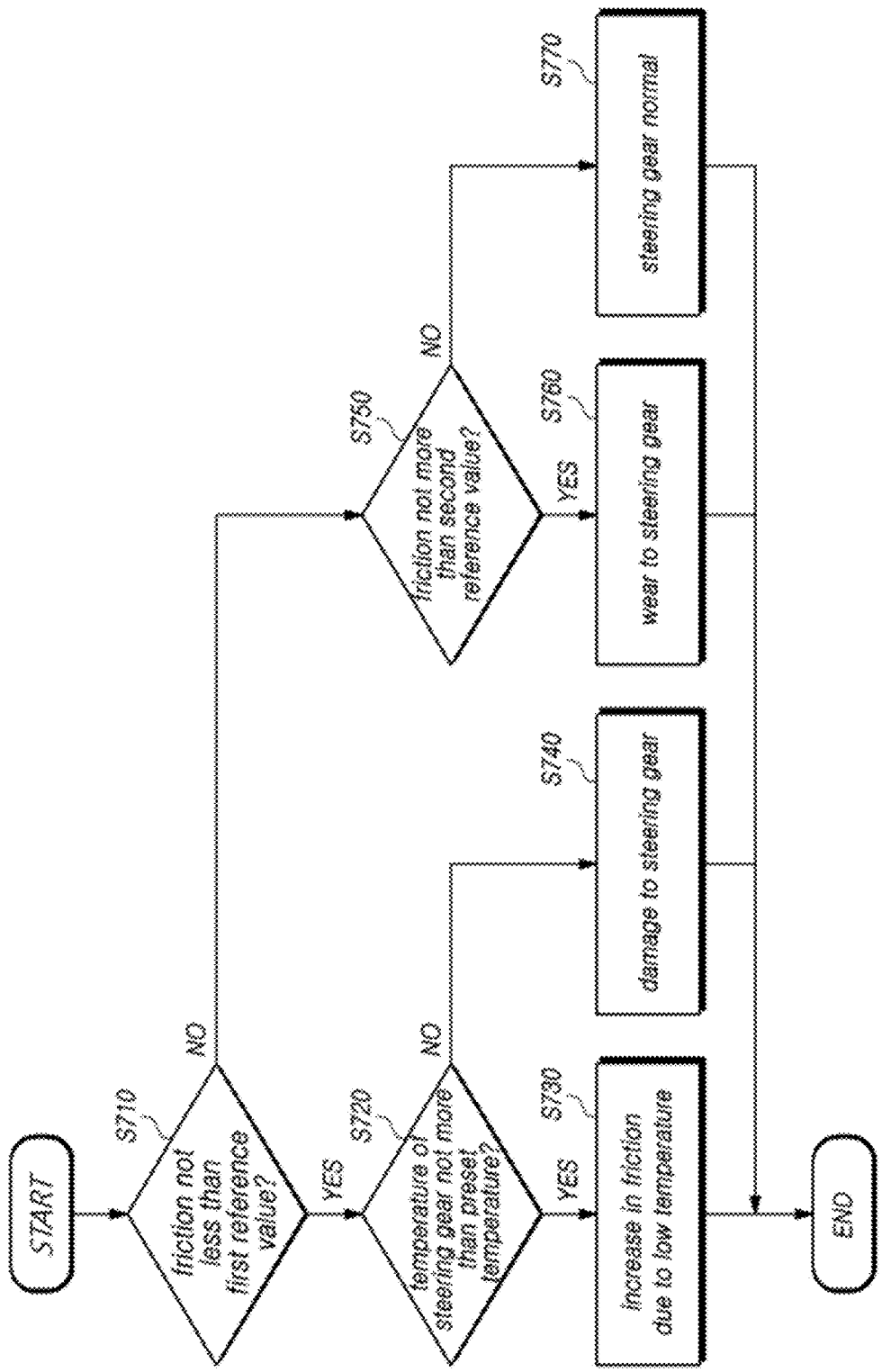
FIG. 7 is a view illustrating, in greater detail, step S530 according to an embodiment.

FIG. 7 is a view illustrating, in greater detail, step S530 according to an embodiment.

Referring to FIG. 7, the steering control method may determine whether the calculated friction is a preset first reference value or more (S710). If the calculated friction is the preset first reference value or more (Yes in S710), the information reception step may further receive the temperature from the temperature sensor provided in the host vehicle, and the state determination step may determine whether the temperature received from the temperature sensor is a preset temperature or less (S720). If the temperature received from the temperature sensor is the preset temperature or less (Yes in S720), the steering control method may determine that the state of the steering gear is an increase in friction due to a low temperature (S730). In this case, although not shown in FIG. 7, the steering control method may output a notification message indicating that the friction of the steering gear has increased due to a low temperature, to the driver. The steering control method may perform additional control to increase the output of the steering motor to compensate for the friction of the steering gear increased due to the low temperature. Also, in this case, the steering control method may suspend the determination of the state of the steering gear until the temperature rises and exceeds the preset temperature and determines that the steering gear is damaged when the friction is equal to or higher than the preset first reference value while the temperature is equal to or higher than the preset temperature.

If the temperature received from the temperature sensor is more than the preset temperature, the steering control method may determine that the steering gear has been damaged (S740). In this case, although not shown in FIG. 7, the steering control method may output a notification message for the damage to the steering gear to the driver.

If the calculated friction is less than the preset first reference value (No in S710), the steering control method may determine whether the calculated friction is a preset second reference value or less (S750).

If the calculated friction is the preset second reference value or less (Yes in S750), the steering control method may determine that the steering gear has been worn (S760). In this case, although not shown in FIG. 7, the steering control method may output a notification message indicating that part replacement is required due to wear to the steering gear, to the driver.

If the calculated friction is more than the preset second reference value (No in S750), the steering control method may determine that the steering gear is in a normal state (S770). In this case, although not shown in FIG. 7, the steering control method may output a notification message indicating that the steering gear is normal, but in the normal state, outputting a notification message may be omitted.

Further, although not shown in FIG. 7, although the steering gear is within the numerical range for normal driving based on the calculated friction, the steering control method may determine that the steering gear has rust buildup based on the calculated friction. For example, the steering control method may calculate the friction of the steering gear whenever the steering gear is driven in the compliance zone, store the calculated frictions, and if the result of comparison between the stored frictions reveals that the friction gradually rises, determine that the steering gear has rust buildup. In this case, the steering control method may output a notification message indicating that repair is required due to rust buildup on the steering gear, to the driver.

As described above, according to the disclosure, the steering control device and method may calculate and quantify only friction of the steering gear, determining the state of the steering gear according to the calculated friction.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A steering control device, comprising:
   a controller configured to drive a steering gear in a host vehicle, before the vehicle is steered by the driver, in a compliance zone in which a rack is not moved while the steering gear is driven; and
   a receiver configured to receive a compliance zone motor torque of a motor from a motor torque sensor provided in the host vehicle, the compliance zone motor torque being sensed and provided by the motor torque sensor while the steering gear is driven in a compliance zone before the vehicle is steered by the driver; and
   wherein the controller is further configured to
      estimate rack force based on the compliance zone motor torque,
      calculate a friction of the steering gear based on the rack force estimated based on the compliance zone motor torque,
      determine a steering gear state based on the calculated friction of the steering gear, and output, to a driver, a notification message for the steering gear state,
   wherein the controller is configured to calculate the friction of the steering gear by determining the rack force estimated while the steering gear is driven in a compliance zone as the friction of the steering gear,
   wherein the receiver further receives a temperature from a temperature sensor provided in the host vehicle,
   wherein, when the calculated friction is equal to or higher than a preset first reference value and the temperature is equal to or lower than a preset minimum temperature for steering gear state determination,
      the controller reserves and suspends the steering gear state determination until the temperature rises and exceeds the preset minimum temperature for the steering gear state determination, and
      then resumes the steering gear state determination when the temperature rises and exceeds the preset minimum temperature for the steering gear state determination, and determines that the steering gear is damaged when the calculated friction is equal to or higher than the preset first reference value while the temperature is equal to or higher than the preset minimum temperature for the steering gear state determination.

2. The steering control device of claim 1, wherein the controller determines that the steering gear is worn if the calculated friction is a preset second reference value or less.

3. The steering control device of claim 1, wherein the controller determines that the steering gear is in a normal state if the calculated friction is less than a preset first reference value and more than a preset second reference value.

4. The steering control device of claim 3, wherein the controller stores the calculated friction and, if a result of comparison between stored frictions reveals that the friction gradually increases, determines that the steering gear has rust buildup.

5. A steering control method, comprising:
   a compliance zone driving step controlling to drive a steering gear in a host vehicle, before the vehicle is steered by the driver, in a compliance zone in which a rack is not moved while the steering gear is driven;

an information reception step receiving a compliance zone motor torque of a motor from a motor torque sensor provided in the host vehicle, the compliance zone motor torque being sensed and provided by the motor torque sensor while the steering gear is driven in a compliance zone before the vehicle is steered by the driver;

a friction calculation step estimating rack force based on the compliance zone motor torque, calculating a friction of the steering gear by determining the rack force estimated based on the compliance zone motor torque as the friction of the steering gear; and a state determination step determining a steering gear state based on the calculated friction of the steering gear, wherein the information reception step further receives a temperature from a temperature sensor provided in the host vehicle, wherein the state determination step comprises: when the calculated friction is equal to or higher than a preset first reference value, and the temperature is equal to or lower than a preset minimum temperature for steering gear state determination, reserving and suspending the steering gear state determination until the temperature rises and exceeds the preset minimum temperature for the steering gear state determination, and then resuming the steering gear state determination when the temperature rises and exceeds the preset minimum temperature for the steering gear state determination, and determining that the steering gear is damaged when the calculated friction is equal to or higher than the preset first reference value while the temperature is equal to or higher than the preset minimum temperature for the steering gear state determination.

6. The steering control method of claim 5, wherein the state determination step determines that the steering gear is worn if the calculated friction is a preset second reference value or less.

7. The steering control method of claim 5, wherein the state determination step determines that the steering gear is in a normal state if the calculated friction is less than a preset first reference value and more than a preset second reference value.

8. The steering control method of claim 7, wherein the state determination step stores the calculated friction and, if a result of comparison between stored frictions reveals that the friction gradually increases, determines that the steering gear has rust buildup.

9. The steering control device of claim 1, wherein the steering gear is configured such that a reaction torque of the motor is transferred to a steering shaft and a steering wheel through the steering gear.

* * * * *